Figure 1A:
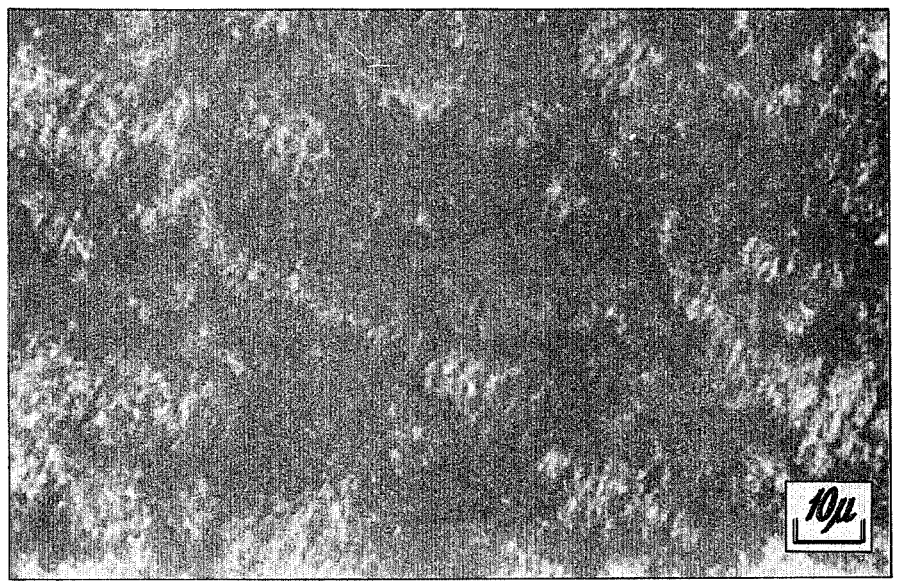

United States Patent [19]

Capaccio et al.

[11] 4,287,149
[45] Sep. 1, 1981

[54] PROCESS FOR THE PRODUCTION OF POLYMER MATERIALS

[75] Inventors: Giancarlo Capaccio, Leeds; Ian M. Ward, Bramhope, both of England

[73] Assignee: National Research Development Corp., London, England

[21] Appl. No.: 943,857

[22] Filed: Sep. 19, 1978

Related U.S. Application Data

[63] Continuation of Ser. No. 782,225, Mar. 28, 1977, abandoned, which is a continuation of Ser. No. 562,043, Mar. 26, 1975, abandoned, and a continuation-in-part of Ser. No. 508,879, Sep. 24, 1974, abandoned.

[30] Foreign Application Priority Data

Oct. 3, 1973 [GB] United Kingdom ............... 46141/74
Mar. 5, 1974 [GB] United Kingdom ............... 9796/74

[51] Int. Cl.$^3$ ............................................. D01D 5/12
[52] U.S. Cl. ............................. 264/210.7; 264/210.8; 264/234; 264/288.8; 264/290.5
[58] Field of Search ............... 264/210.4, 210.8, 210.7, 264/234, 288.8, 290.5

[56] References Cited

U.S. PATENT DOCUMENTS

| 3,361,859 | 1/1968 | Ceuzato | 264/176 F |
| 3,447,202 | 6/1969 | Kato | 264/176 F |
| 3,462,205 | 8/1969 | Ward et al. | 526/352 |
| 3,536,219 | 10/1970 | Williams et al. | 264/210.8 |
| 3,651,196 | 3/1972 | Starkweather | 264/210.1 |
| 3,946,094 | 3/1976 | Kauetsana et al. | 264/28 |

FOREIGN PATENT DOCUMENTS

| 275863 | 2/1964 | Australia | 264/176 F |
| 656080 | 1/1963 | Canada | 264/176 F |
| 667632 | 7/1963 | Canada | 264/176 F |
| 792165 | 8/1968 | Canada | 264/176 F |
| 37-9765 | 7/1962 | Japan | 264/176 F |
| 39-12859 | 7/1964 | Japan | 264/176 F |
| 40-1813 | 2/1965 | Japan | 264/190 |

OTHER PUBLICATIONS

Nature Physical Science, vol. 243, No. 130, p. 143, by Capaccio et al., Jun. 25, 1973.
J. of Polymer Science Pt. A-2, vol. 8, 1710-1740 Meinel et al., 1970, John Wiley Inc.
J. of App. Polymer Sci. vol. 8, pp. 2359-2387, 1964, by Sheehan et al.
J. of Polymer Sci. Pt. A-2, vol. 7, 1275-1278, by Peterlio et al., 1969.
Die Makromolek Chemie 105 (1967) 193-207, by Corneliussen et al.
J. of Materials Science 5 (1970) 411-417 by Andrews et al.
J. of Polymer Science Pt. A-2, vol. 6, 1273-1282 (1968) Peterlin et al.
J. of Polymer Science Pt. A-2, vol. 9, 67-83 (1964), by Meinel et al.
Textile Res. J. pp. 626-636 (1965) by Sheehan et al.

Primary Examiner—Jay H. Woo

[57] ABSTRACT

A high modulus polymer material is produced by subjecting a crystallisable polymer to a thermal treatment under conditions such that the possibility that a given molecular chain is incorporated in more than one crystal lamella is substantially reduced and then attenuating the polymer at an imposed rate and temperature whereby substantially complete alignment of its molecules may be obtained.

15 Claims, 4 Drawing Figures

PROCESS FOR THE PRODUCTION OF POLYMER MATERIALS

This is a continuation of application Ser. No. 782,225, filed Mar. 28, 1977 now abandoned, which is a continuation of Ser. No. 562,043 filed Mar. 26, 1975, now abandoned, and a continuation in part of Ser. No. 508,879, filed Sept. 24, 1974, now abandoned.

This invention relates to certain new polymer materials, and processes for their production.

U.K. Patent Application Ser. No. 10746/73 describes shaped articles, and particularly filaments films, and fibres of high density polyethylene, having a Young's modulus (dead load creep) of greater than $3 \times 10^{10}$ N/m$^2$. According to U.K. Patent Application Ser. No. 10746/73 polyethylene articles of high modulus are obtained from polymers having a weight average molecular weight ($\overline{M}w$) of less than 200,000 and a number average molecular weight ($\overline{M}n$) of less than 20,000 and a ratio of $\overline{M}w/\overline{M}n$ of less than 8 where $\overline{M}n$ is greater than $10^4$, and of less than 20 where $\overline{M}n$ is less than $10^4$ by cooling the polymer from a temperature at or close to its melting point at a rate of 1° to 15° per minute followed by drawing the cooled polymer.

According to the present invention, it has now been found that a high modulus polymer material may be produced by subjecting a crystallisable polymer to a thermal treatment under conditions such that the possibility that a given molecular chain is incorporated in more than one crystal lamella is substantially reduced and then attenuating the polymer at an imposed rate and temperature whereby substantially complete aligment of its molecules may be obtained.

The present invention provides a process for the production of a high modulus polymer material which comprises subjecting a crystallisable polymer having a weight average molecular weight of less than 300,000 and preferably less than 200,000 to a thermal treatment such that the possibility that a given molecular chain is incorporated in more than one crystal lamella is substantially reduced, and attenuating the polymer at a temperature and a rate such that the deformation ratio is at least 15.

In this specification a crystallisable polymer is defined as one that is capable of forming a crystalline or semi-crystalline structure on cooling from the melt. The invention may be applied to a range of crystallisable polymers, but is particularly applicable to vinyl polymers, and more especially to those vinyl polymers that crystallise in a folded chain form, for example linear vinyl hydrocarbon polymers such as polyethylene, polypropylene and ethylene/propylene block copolymers. The invention may also be applied to other essentially linear organic polymers such as polyethylene oxide, polyoxymethylene and polyacetaldehyde, and fluorinated polymers such as polytetrafluoroethylene and polychlortrifluorethylene. Particularly good results have been obtained with high density polyethylene which in this specification is defined as a substantially linear homopolymer of ethylene or a copolymer of ethylene containing at least 95% by weight of ethylene, having a density of from 0.91 to 1.0 gms/cm$^3$ as measured by the method of British Standard Specification No. 2782 (1970) method 509B on a sample prepared according to British Standard Specification No. 3412 (1966) Appendix A and annealed according to British Standard Specification No. 3412 (1966) Appendix B(1), such as for example that produced by polymerising ethylene in the presence of a transition metal catalyst.

The crystallisable polymer should have a reasonably high weight average molecular weight in order that the shaped article after attenuation will have acceptable physical properties, such as tenacity and extensibility at break. However a high concentration of long molecules increases the chance that a given molecular chain before attenuation will become incorporated in more than one crystal lamella. Henceforth in this specification such molecular chains will be termed "inter-lamellar molecular chains". Although the invention is not limited to any particular theory it is believed that an excessive number of inter-lamellar molecular chains reduces the degree of molecular orientation and alignment obtainable upon attenuation due to an increase in the number of permanent physical entanglements, and consequently prevents the attainment of the optimum physical properties.

Preferably the weight average molecular weight ($\overline{M}w$) of the polymer is from 50,000 to 250,000, more preferably 50,000 to 150,000 and the number average molecular weight ($\overline{M}n$) is preferably from 5,000 to 25,000 more preferably 5,000 to 15,000. It will usually be advantageous to avoid large values of the ratio of Mw to Mn in order that there is a more homogeneous deformation at a molecular level during the attenuation process. Preferably the ratio of $\overline{M}w$ to $\overline{M}n$ is less than 30. Particularly good results have been obtained using polymers having a relatively narrow molecular weight distribution, such that for $\overline{M}n$ greater than $10^4$, $\overline{M}w/\overline{M}n$ is less than 10 and preferably less than 8 and most preferably less than 6, and for $\overline{M}n$ less than $10^4$, $Mw/\overline{M}n$ is less than 25 and most preferably less than 15. The molecular weights quoted in this specification are those measured by the gel permeation chromatography method.

The thermal treatment may have the effect of reducing the probability that an excessive number of molecular chains are incorporated in more than one lamella for example by achieving a molecular weight fractionation in the sense that a substantial fraction of the molecules of intermediate molecular weight are allowed to crystallise in discrete very regularly folded chain lamellae whilst a smaller number of both very high and very low molecular weight molecules separate and in a few cases interconnect the crystalline regions. This effect may be obtained in three ways:

(1) Cooling the polymer from a temperature at or above its melting point at a predetermined rate to ambient temperature so that the desired crystal structure is obtained. The cooling rate used is dependent upon the molecular weight characteristics of the polymer. Usually it is necessary to cool the polymer at an imposed rate of less than 40° C. per minute and preferably less than 20° C. per minute. Most preferably the cooling rate is less than 10° C. per minute.

(2) Cooling the polymer from a temperature at or above its melting point at a predetermined rate to a temperature below its crystallisation temperature and then quenching the polymer to ambient temperature. The cooling rate is preferably from 1° to 15° C. per minute, and most preferably from 2° to 10° C. per minute. Preferably the polymer is quenched after reaching a temperature of from 5° to 20° C. below its crystallisation temperature. Quenching should preferably be at a rate of less than 100,000° C. per minute.

(3) Rapidly cooling or quenching the polymer from a temperature at or above its melting point to a temperature close to or at its crystallisation temperature and maintaining the polymer at that temperature for a period of time sufficient to allow crystallisation to occur.

Preferably the polymer is held at a temperature which is within 15° C. of the crystallisation temperature for a period of time of from 0.5 to 10 minutes. Subsequently, the polymer is preferably quenched to ambient temperature.

Optical micrographs of samples produced according to methods (1), (2) and (3) above show that polymers having the specified molecular weight characteristics produce a macrostructure comprising uniformly oriented domains of varying size which occupy the whole of the polymer. For high density polyethylene these domains can be up to $15\mu$ in size.

The choice of conditions used in methods (1), (2) and (3) will depend upon the molecular weight characteristics of the polymer. In general, however, extremely slow cooling rates (less than 1° C./minute) do not produce a crystal structure suitable for attenuation if the polymer has a particularly narrow molecular weight distribution. Also cooling rates greatly in excess of 40° C./minute for methods (1) and (2) and excessive periods of retention at the crystallisation temperature for method (3) have also been found to be deleterious.

Figure 1B:
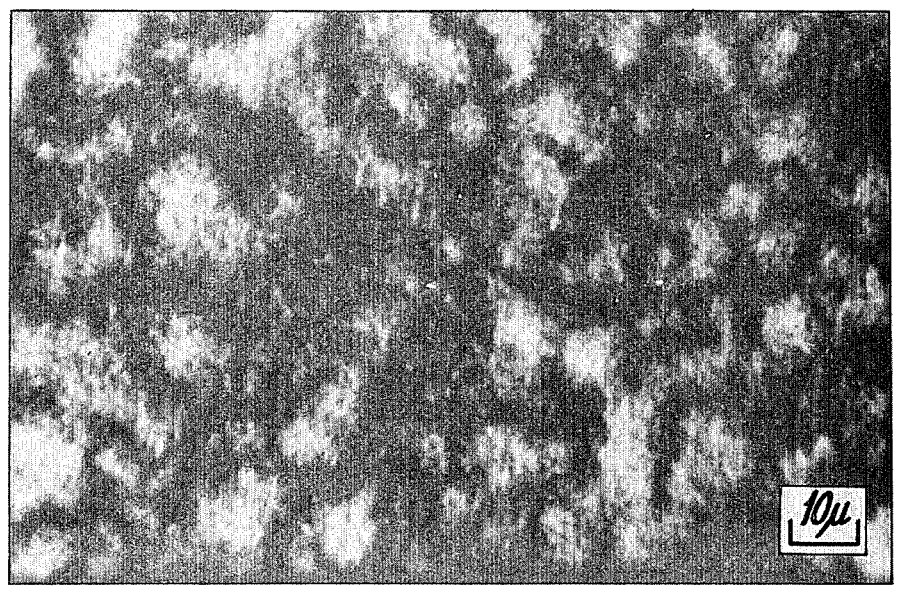
Figure 1C:
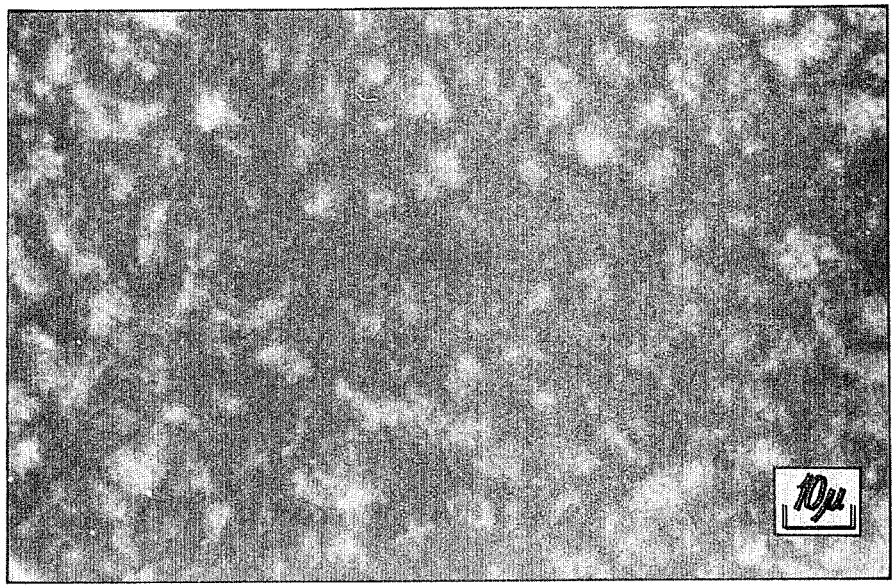

FIGS. 1(a), 1(b) and 1(c) illustrate, in the case of high density polyethylene, respectively, crystal structures produced by methods (1), (2) and (3) of the present invention.

An alternative method of producing a crystal structure in which the possibility that a given molecular chain is incorporated in more than one crystal lamella is substantially reduced, comprises cooling the polymer very rapidly from a temperature at or above its melting point to a temperature well below its crystallisation temperature to achieve a comparatively low crystallinity. This method, which will be termed method (4) greatly reduces the size of the spherulites and produces a structure comprising crystallites surrounded by large amorphous regions, thereby reducing the number of inter-lamellar molecular chains. Preferably the cooling rate is in excess of 1,000° C./minute, most preferably in excess of 5,000° C./minute through the crystallisation range, and the polymer is cooled to ambient temperature or below. Depending upon the molecular weight characteristics of the polymer it may be found advantageous to reheat the cooled polymer to increase the size of the crystalline regions before attenuation.

Figure 1D:
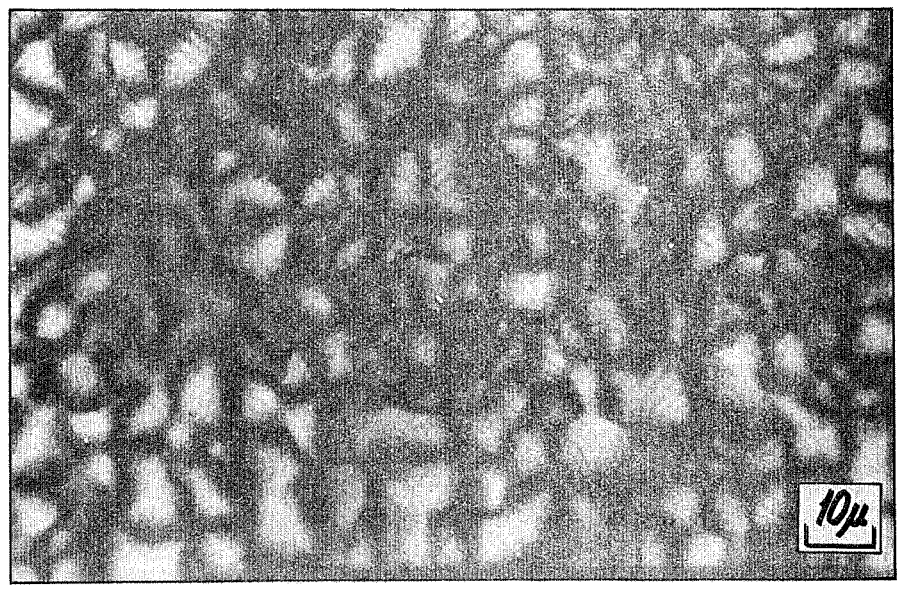

Optical micrographs of samples produced by method (4) show more conventional clearly banded spherulitic structures, but may be distinguished by the small size of the spherulites. FIG. 1(d) illustrates, in the case of high density polyethylene, a crystal structure produced by method (4) of the present invention.

The structures formed in the different methods of thermal treatment do not deform equally under given conditions. For each structure there will be an optimum attenuation procedure. Attenuation may be undesirably limited if there is appreciable molecular orientation in the undrawn material.

The crystallisation of the polymers has been extensively studied and books such as Crystallisation of Polymers by L. Mandelkern published by McGraw-Hill 1964 (Chapter 8—Crystallisation Kinetics and Mechanism) review the subject. By observing changes in properties such as density or specific volume, it has been shown that crystallisation occurs in stages. There may be a time delay before crystallisation is observed, but as soon as it is observed the process proceeds at an accelerating rate which is almost autocatalytic in nature. Finally, a pseudo-equilibrium level of crystallisation is reached, after which a small but definite amount of crystallisation at very slow rates persists for a long period of time. The crystallisation process is a continuous one with no sudden changes or discernible discontinuities observed in the plot of degree of crystallisation against time which is sigmoidal in shape. The rapid crystallisation is referred to as initial crystallisation, and the slower crystallisation stage is referred to as secondary crystallisation. It is believed that secondary crystalliation is disadvantageous in obtaining high moduli, and whereas some polymers may tolerate a degree of secondary crystalliation and still give acceptable properties on attenuation, it is found that the highest moduli are obtained when secondary crystallisation has not been allowed to become the dominant process. At least for methods (1), (2) and (3) it is usually found to be advantageous to allow crystalliation to proceed until the rapid initial crystalliation is substantially complete. The progress of crystallisation can be followed by measuring the density of the polymer.

In methods (1), (2) and (3), for a given method of thermal treatment and a given polymer, the maximum attenuation achievable (hence the maximum modulus obtainable) increases with increasing density of the polymer until an optimum density is reached, above which the maximum attenuation obtainable may decrease. By attenuating samples of different densities under the same conditions, it is thus possible to determine the optimum density of the polymer for a given set of attenuation conditions.

After thermal treatment the polymer is then attenuated at a temperature and a rate such that the deformation ratio is at least 15, and preferably at least 20. It is believed that the high degree of attenuation required to obtain a high modulus is achieved by a homogeneous extension of the polymer, corresponding at the molecular level to the unfolding of the molecules in the crystal lamellae and their subsequent orientation.

A particularly preferred attenuation process comprises drawing the polymer to a high draw ratio at a speed and at a temperature such that the tension of drawing is less than the tensile strength of the polymer, but sufficient to produce alignment of the molecules by inducing the required plastic deformation over and above any extension which may be produced by flow drawing. Preferably the draw ratio is at least 20.

The optimum drawing conditions depend to some extent upon the nature of the polymer and its previous thermal history. As a general rule the polymers are preferably drawn relatively slowly for example between relatively movable clamping means, at speeds in excess of 1 cm per minute, usually around 10 to 20 cm per minute and at a temperature at least 40° C. below the melting point of the polymer or on a draw frame at speeds of from 30 to 150 cms per minute at higher temperatures of from 5° to 20° C. below the melting point.

It has been found that the physical properties of the polymer material can sometimes be further improved by carrying out the drawing process in incremental stages, allowing the polymer to rest between successive stages.

It is preferred to carry out the drawing process upon a polymer having a relatively small cross-section and the invention is particularly suitable for the production of fibres and films. In particular continuous filaments may be produced by melt spinning and drawing on a draw frame. For convenience the diameter of the fibre, or the thickness of the film, before drawing is preferably less than 1 mm.

In this specification the deformation ratio or draw ratio is defined either as the ratio of the final length to the initial length or as the ratio of the cross-sectional areas before and after drawing.

The process of the invention is capable, for example, of producing a polyethylene polymer material having a Young's modulus as hereinafter defined well in excess of $3 \times 10^{10}$ N/m$^2$ and in some cases at le st $6 \times 10^{10}$ N/m$^2$. The Young's modulus of a polymer material depends partly upon the method of measurement, and therefore in this specification Young's modulus is defined as being the modulus measured at 21° by a dead-loading creep experiment, as described by Gupta & Ward in J. Macromo. Sci. Phys. B1 373 (1967), taking the 10 second response at a strain of 0.1%. It is found that, in accordance with the process of the invention, substantially complete alignment of the polymer molecules can be obtained by plastic deformation. The molecular orientation will in most cases be uniaxial, although it is also possible with an appropriate drawing process, to produce biaxially oriented polymer materials. The presence of substantially complete orientation may be determined by physical measurements, such as for example, X-ray diffraction measurements, or nuclear magnetic resonance studies.

By the process of the present invention polyethylene materials with a modulus above $5 \times 10^{10}$ N/m$^2$ have been produced. A theoretical estimate for the Young's modulus of polyethylene is $24 \times 10^{10}$ N/m$^2$ and it can thus be seen that the polymer materials of the invention have a modulus which approaches quite closely to this figure.

Polymer materials according to the present invention can be produced in the form of coherent unitary structures.

The invention is illustrated by the following Examples:

EXAMPLE 1

Isotropic filaments of 0.06-0.07 cm diameter are obtained by melting spinning high density polyethylenes (described hereinafter) at 190° C. through a 0.1 diameter die. The filaments are wound up on a cylinder of 5.5 cm diameter rotating at a speed of 2.3 revs/min. The cooling rate of the polymer is arranged to be 5° C. per minute and the structure produced when the temperature of the polymer reaches 115° C. is preserved by rapid cooling. Samples 3-4 cm long are subsequently drawn on an Instron tensile testing machine at 72° C. with a cross-head speed of 20 cm/min for 30-45 secs. The draw ratio is determined from the variation in cross-section of the filament.

This process is undertaken with two polymers from the commercial range of BP high density polyethylene; 075-60 grade with a melt flow index of 8.0 measured at 190° C. with a load of 2.14 kg, $\overline{M}_n$ of 14,450, and $\overline{M}_w$ of 69,100, and for comparison, Rigidex 9, with a melt flow index of 0.9, $\overline{M}_n$ of 6,060 and $\overline{M}_w$ of 126,600. The 10 sec Young's modulus is measured at room temperature (21° C.). The 075-60 grade had a narrow molecular weight distribution, $(\overline{M}w/\overline{M}n)=4.8$, and gives a drawn product having a draw ratio of 20 and a Young's modulus of $4.0 \times 10^{10}$ N/m$^2$. In contrast, the Rigidex 9 has a broader molecular weight distribution, $(\overline{M}w/\overline{M}n)=20.9$ as well as higher $\overline{M}w$ value, and consequently gives a drawn product having a considerably lower modulus. Continuous filaments of the above materials may be drawn on a draw frame with similar results.

EXAMPLE 2

0.05-0.07 cm thick sheets are obtained by compression moulding high density polyethylene pellets at 160° C. between two copper plates. These sheets are then removed from the press and slowly cooled at a rate of 7°-9° C./min to a temperature of 100° C. (measured on the surface of the copper plate) and then quenched in cold water. Rectangular samples 2 cm long and 0.5 cm wide are drawn on an Instron tensile testing machine at 75° C. at a cross-head speed of 10 cm/min for 70-90 secs. The draw ratio is measured from marks on the surface of the undrawn samples spaced at intervals of 0.2 or 0.1 cm.

The polymers investigated are two different grades from the commercial range of BP high density polyethylene, Rigidex 50, with a melt flow index of 5.5 $\overline{M}n$ of 6180 and Mw of 101,450, and 140-160 grade with a melt flow index of 12, $\overline{M}n$ of 13,350 and Mw of 67,800. A maximum draw ratio of 30 is measured for the Rigidex 50, and a maximum draw ratio of 37-38 for the 140-60 grade.

The 10 sec Young's modulus for representative samples is measured at room temperature and the results given in the following Table 1.

TABLE 1

| Materials | Melt Flow Index | Draw Ratio | 10 sec Young's modulus (N/m$^2$ × 10$^{-10}$) strain 0.1 × 10$^{-2}$ after thermal treatment and drawing Room temperature |
| --- | --- | --- | --- |
| Ridigex 50 | 5.5 | 27 | 5.7 |
| " | " | 30 | 6.8 |
| 140-160 | 12.0 | 28 | 5.7 |

Examples 3 to 5 illustrate that the maximum draw ratio obtainable occurs at an optimum density, and that the optimum density is a function of the conditions of the thermal treatment.

EXAMPLE 3

A film of high density polyethylene (Rigidex 25—a product of BP Ltd.—having $\overline{M}w$ of 98,800 and $\overline{M}n$ 12,950) was formed by compression moulding at 160° C. the polymer between two copper sheets of 0.5 mm thickness. The plates were then removed from the press and wrapped in a thick layer of cotton wool whereby the polymer, as shown by a thermocouple, cooled at a rate of 5° C. per minute. On reaching 120° C. the plates were dropped into a bath of glycerol maintained at 120° C. and kept there for a period of time varying from 0 (no bath) to 10 minutes. The density of the film was measured using a density column. Dumbell samples of the film were drawn for 60 seconds on an Instron Tensile Testing Machine at a temperature of 75° C. and a crosshead speed of 10 cm per minute. The undrawn sample was marked at intervals of 0.2 cms or 0.1 cms and the draw ratio occurring during drawing was determined by the increase in length of the drawn sample. Table 2 shows the effects of dwell time at 120° C. on density and the maximum draw ratio.

EXAMPLE 4

Example 3 was repeated except that the plates on removal from the press were immediately immersed in the glycerol bath, the polymer thereby cooling from 160° C. to 120° C. at a rate of 40° C. per minute. Table 2 shows the effect of density on draw ratio.

being varied. The temperature of the filament entering the bath was about 135° C. The filament was drawn under the conditions as described in Example 3. Further details of the spinning and drawing conditions, and of the properties of the drawn filament are given in Table 3, the modulus being measured at 21° C. by a dead load creep experiment as described by Gupta & Ward in J. Macromol. Sci. Phys. B1, 373 (1967).

TABLE 3

| | Through-put (g.p.m.) | Extrusion temp. (°C.) | Wind up speed (fpm) | Distance of bath from spinneret | Bath temp. (°C.) | Bath lgth cms | Density (tonne/m³) | Maximum draw ratio | Creep modulus ($\times 10_2^{-8}$ N/m) |
|---|---|---|---|---|---|---|---|---|---|
| a | 0.3 | 180 | 5 | None | None | None | 0.9554 | 14 | — |
| b | — | 180 | 5 | 8 | 120 | 150 | 0.9617 | 33.5 | 500 |
| c | 0.71 | 180 | 5 | 12.5 | 120 | 150 | 0.9626 | 33.5 | 600 |
| d | 0.54 | 180 | 5 | 12.5 | 120 | 50 | 0.9620 | 54 | 720 |

EXAMPLE 5

Example 3 was repeated except that the polymer was sandwiched between sheets of aluminium foil and the whole sandwiched between copper plates which were immediately removed before the aluminium plates and film were dropped into the glycerol bath. The rate of cooling in this case was 400° C. per minute, and the effect of dwell time at 120° C. on density and maximum draw ratio obtainable is given in Table 2.

TABLE 2

| Example | Cooling Rate (°C. per min) | Time at 120° C. (mins) | Density (tonne/m³) | Maximum Draw Ratio |
|---|---|---|---|---|
| 3 | 5 | 0 | 0.9628 | 19.5 |
| | | 1 | 0.9646 | 16.8 |
| | | 2 | 0.9648 | 18.2 |
| | | 3 | 0.9646 | 16 |
| 4 | 40 | 0 | 0.9508 | 10.3 |
| | | 1 | 0.9597 | 12 |
| | | 2 | 0.9628 | 16 |
| | | 9 | 0.9656 | 15 |
| 5 | 400 | 0.5 | 0.9546 | 17.5 |
| | | 1 | 0.9606 | 20 |
| | | 2 | 0.9618 | 18.3 |
| | | 10 | 0.9646 | 16.5 |

EXAMPLE 6

High density polyethylene (Rigidex 140-60—a product of BP Ltd.—having Mw of 67,800 and Mn 13,350) was extruded at 180° C. through a spinneret having an orifice of 0.9 mm to give a filament which was passed through a bath of glycerol maintained at 120° C. before being wound up, the position of the bath below the spinneret and the dwell time of the filament in the bath The spun filament of Example 6 when cross-sectioned and examined under a polarising microscope exhibited uniformly orientated regions evenly scattered throughout the material, the regions being suggestive of the initial sheaves in spherulitic growth.

EXAMPLE 7

Example 6 was repeated except that the spun filament was wound up at a speed of 150 cm per minute and the temperature of the bath was varied from 60° to 125° C. The temperature of the filament on entering the bath was measured using an infra-red pyrometer. Details of the properties of the spun filament are given in Table 4.

EXAMPLE 8

High density polyethylene (Rigidex 140-60) was spun into a single filament and quenched using the same apparatus as that used for Example 6. The conditions used were as follows:

| | |
|---|---|
| Throughput | 0.3 g.p. min. |
| Extrusion temperature | 180° C. |
| Wind-up speed | 5 f.p.m. |
| Quench distance from spinneret | 7.5 cm |
| Quench temperature | 120° C. |
| Quench length | 50 cm |

The resulting spun yarn was drawn continuously on a draw frame over a pin maintained at 130° C. at a draw ratio of 23.8 and a draw speed of 1 f.p.m. The drawn filament has a tenacity of 6.7 g.p.d' tex and extension to break of 2.9%, and a creep modulus of $450 \times 10^8$ N/m².

TABLE 4

| | Length of bath (cm) Bath Temp (°C.) | Filament Diameter (mm) | Dwell time (sec) Filament Temp. at Entry (°C.) | 12.5cm/5s Max DR | 12.5cm/5s Density g/cm³ | 25cm/10s Max DR | 25cm/10s Density g/cm³ | 50cm/20s Max DR | 50cm/20s Density g/cm³ | 100cm/40s Max DR | 100cm/40s Density g/cm³ | 150cm/60s Max DR | 150cm/60s Density g/cm³ | 300cm/120s Max DR | 300cm/120s Density g/cm³ |
|---|---|---|---|---|---|---|---|---|---|---|---|---|---|---|---|
| a | 125 | 0.65 | 120 | — | — | — | — | Broke | 0.9619 | — | — | Broke | 0.9640 | — | — |
| b | 120 | 0.45 | 120 | — | — | — | — | Broke | 0.9612 | — | — | 11.5 | 0.9618 | — | — |
| c | 120 | 0.65 | 120 | 19 | 0.9604 | 25–30 | 0.9610 | 17–22 | — | Broke | 0.9610 | — | — | Broke | 0.9620 |
| d | 120 | 0.65 | 130 | 17 | 0.9604 | 13–22 | 0.9607 | 27–31 | 0.9612 | 16 | — | Broke | 0.9618 | — | — |
| e | 120 | 0.65 | 135 | 28 | 0.9603 | — | — | 16 | 0.9624 | — | — | — | — | — | — |
| f | 120 | 0.80 | 120 | — | — | — | — | Broke | 0.9624 | — | — | Broke | 0.9628 | — | — |
| g | 110 | 0.65 | 120 | — | — | — | — | 17 | 0.9617 | — | — | 16 | 0.9617 | — | — |
| h | 100 | 0.65 | 120 | — | — | — | — | 16 | 0.9612 | — | — | 25 | 0.9610 | — | — |

TABLE 4-continued

| Bath Temp (°C.) | Length of bath (cm) Filament Diameter (mm) | Dwell time (sec) Filament Temp. at Entry (°C.) | 12.5cm/5s Max DR | Density g/cm³ | 25cm/10s Max DR | Density g/cm³ | 50cm/20s Max DR | Density g/cm³ | 100cm/40s Max DR | Density g/cm³ | 150cm/60s Max DR | Density g/cm³ | 300cm/120s Max DR | Density g/cm³ |
|---|---|---|---|---|---|---|---|---|---|---|---|---|---|---|
| i 90 | 0.65 | 130 | — | — | — | — | Broke | — | — | — | 23 | — | — | — |
| j 90 | 0.65 | 120 | — | — | — | — | Broke | — | — | — | 16 | — | — | — |
| k 60 | 0.65 | 120 | — | — | — | — | Broke | — | — | — | Broke | — | — | — |

EXAMPLE 9

Samples of Rigidex 50 and 140-60 grade were compression moulded between metal plates at a temperature of 160° C. and subsequently cooled down to room temperature at a non-linear cooling rate <0.8° C./min. 2 cm long and 0.5 cm wide dumbell samples were then drawn in an Instron at 75° C. Details of the experiment and results are shown in Table 5.

The remarkable difference in drawing behaviour for samples of identical initial crystallinity is related to the width of the molecular weight distribution and hence the molecular weight of the molecules in the non-crystalline phase.

Optical micrographs of isotropic samples of Rigidex 50 prepared in this way show regions of uniform orientation whilst the isotropic samples of 140-60 polymer exhibit before drawing a clear spherulitic morphology.

TABLE 5

| Polymer | Density of isotropic sheet (g/cm³) | Cross-head speed (cm/min) | Draw ratio (λ) | Density of drawn samples (g/cm³) |
|---|---|---|---|---|
| Rigidex 50 | 0.973 | 10 | ~25 | 0.963 |
| " | 0.973 | 5 | ~25 | 0.963 |
| 140-60 | 0.973 | 10 | Break | — |
| " | 0.973 | 5 | Break | — |

EXAMPLE 10

Samples of Rigidex 50, 140-60 grade BXP 10 (a polyethylene of $\overline{M}n$ 168,000 and $\overline{M}w$ 93,800) and Rigidex 9 were compression moulded at 160° C. between metal plates and then quenched in water at room temperature. High draw ratios were obtained by drawing 2 cm long and 0.5 cm wide dumbell samples at 75° C. in an Instron for different times. Experimental details and results are shown in Table 6.

TABLE 6

| Polymer | Cross-head speed (cm/min) | Drawing time (sec) | Draw ratio (λ) |
|---|---|---|---|
| Rigidex 50 | 10 | 160 | 20 |
| " | 10 | 290* | 32* |
| 140-60 | 10 | 150 | 30 |
| BXP-10 | 10 | 160 | 17 |
| BXP-10 | 10 | 250* | 31* |
| Rigidex 9 | 10 | 215 | 23 |

*These samples due to the experimental limitations have been obtained by redrawing part of the samples originally drawn for 160 seconds under the assumption of a continuous deformation process.

EXAMPLE 11

Polypropylene samples of different molecular weight were spun at 185° C. through a die of 0.2 cm diameter using a ram speed of 0.6 cm per minute and a winding up speed of 110 cm per minute in air. The take up spool was at about 3 cm from the die. The filaments were drawn on a draw frame at a take up speed of about 130 cm per minute and the multi-stage process is described in Table 7:

TABLE 7

| Stage | Pin temperature in °C. | Imposed Draw Ratio |
|---|---|---|
| 1st | 120 | 7:1 |
| 2nd | 110 | 1.5:1 |
| 3rd | 100 | 1.5:1 |
| 4th | 90 | 1.5:1 |

Molecular weight characteristics, draw ratios and creep moduli for the two materials examined are shown in Table 8:

TABLE 8

| Material | Machine Draw Ratio | Modulus N/m² × 10⁻¹⁰ | Modulus g.p. d'tex |
|---|---|---|---|
| H.F. 56 $\overline{M}w = 260,000$ $\overline{M}n = 39,000$ | 23 | 0.8 | 90 |
| Degraded H.F. 56 $\overline{M}w = 134,000$ $\overline{M}n = 30,000$ | 23 | 1.4–1.6 | 157–179 |

EXAMPLE 12

Isotropic filaments of 0.04–0.06 cm diameter are obtained by melt-spinning polyoxymethylene (Delrin 500—a product of Du Pont de Nemours having $\overline{M}_n$ of 45,000 and $\overline{M}_w/\overline{M}_n$ slightly greater than 2) at ¾180° C. through a 0.2 cm diameter die in air using a ram speed of approximately 0.6 cm/min and a winding-up speed of 36 cm/min. The take-up spool was at about 7 cm from the die.

The filaments were drawn in two stages on a drawframe at a take-up speed of about 50 cm/min. Details of the process are given in Table 9.

TABLE 9

| Stage | Pin Temperature in °C. | Imposed Draw Ratio | Total Draw Ratio* |
|---|---|---|---|
| 1st | ~140° C. | 7.1 | 7.4:1 |
| 2nd | ~140° C. | 2.8:1 | 20:1 |

*As measured from the displacement of marks on the sample surface.

The 10 sec Young's moduli, as from a dead loading creep experiment, at different temperatures are shown in Table 10.

TABLE 10

| Temperature (°C.) | Young's Modulus (N/m² × 10⁻¹⁰) |
|---|---|
| +20 | 4.9 |
| −50 | 5.9 |
| −150 | 8.1 |

We claim:

1. A process for the production of a high modulus polymer material which comprises quenching a crystallizable polymer selected from the group consisting of high density polyethylene, ethylene copolymers containing at least 95% by weight of ethylene, and polyoxymethylene having a weight average molecular weight ($\overline{M}w$) of less than 300,000 and a ratio of $\overline{M}w$ to number average molecular weight ($\overline{M}n$) less than 30 from a temperature at or above its melting point to a temperature at or close to its crystallization temperature; maintaining the polymer at the temperature for a time sufficient to allow crystallization to occur; and then attenuating the polymer at a temperature below its melting point at a rate such that the deformation ratio (the ratio of the final length to the initial length) is at least 15.

2. A process according to claim 1, in which the crystallizable polymer has $\overline{M}w < 200,000$.

3. A process according to claim 1, in which the crystallizable polymer is high density polyethylene.

4. A process according to claim 1, in which $\overline{M}w$ is from 50,000 to 250,000.

5. A process according to claim 4, in which $Mw$ is from 50,000 to 150,000.

6. A process according to claim 3, in which $\overline{M}n$ is from 5,000 to 25,000.

7. A process according to claim 6, in which $\overline{M}n$ is from 5,000 to 15,000.

8. A process according to claim 1, in which for $\overline{M}n$ greater than $10^4$, $Mw/Mn$ is less than 10 and for $Mn$ less than $10^4$, $\overline{M}w/\overline{M}n$ is less than 25.

9. A process according to claim 1, in which the deformation ratio is at least 20.

10. A process according to claim 1, in which the polymer is attenuated on a draw frame at a speed of from 30 to 150 cm per minute at a temperature of from 5° to 20° C. below the melting point of the polymer.

11. A process according to claim 1, in which the attenuation is carried out in incremental stages, allowing the polymer to rest between successive stages.

12. A process according to claim 1, in which there is produced a fiber or film.

13. A process according to claim 12, in which the diameter of the fiber or the thickness of the film before attenuation is less than 1 mm.

14. A process according to claim 1, in which the crystallizable polymer is polyoxymethylene.

15. A process according to claim 14, wherein attenuation is effected at a temperature of about 140° C.

* * * * *